(12) United States Patent
Cooper

(10) Patent No.: US 8,900,451 B2
(45) Date of Patent: *Dec. 2, 2014

(54) DEVICE AND METHOD FOR REMOVING SOLIDS AND LIQUIDS FROM A POT

(76) Inventor: Michele Cooper, Short Hills, NJ (US)

( * ) Notice: Subject to any disclaimer, the term of this patent is extended or adjusted under 35 U.S.C. 154(b) by 2019 days.

This patent is subject to a terminal disclaimer.

(21) Appl. No.: 11/416,644

(22) Filed: May 2, 2006

(65) Prior Publication Data

US 2006/0254976 A1 Nov. 16, 2006

Related U.S. Application Data

(63) Continuation-in-part of application No. 11/377,111, filed on Mar. 16, 2006, now Pat. No. 7,185,766, which is a continuation of application No. 11/042,711, filed on Jan. 25, 2005, now Pat. No. 7,172,705.

(60) Provisional application No. 60/563,507, filed on Apr. 19, 2004.

(51) Int. Cl.
C02F 1/40 (2006.01)
A47J 43/28 (2006.01)
A47J 36/20 (2006.01)

(52) U.S. Cl.
CPC ............. *A47J 43/285* (2013.01); *A47J 36/20* (2013.01)

USPC ........... 210/232; 210/470; 210/474; 210/513; 99/410; 99/449; 99/450; 99/496

(58) Field of Classification Search
USPC ............ 210/232, 513, 470, 533, 474; 99/410, 99/449, 450, 496
See application file for complete search history.

(56) References Cited

U.S. PATENT DOCUMENTS

| 19,419 | A | * | 2/1858 | Haines | 100/226 |
| 452,521 | A | * | 5/1891 | Hartman | 99/449 |
| 803,814 | A | * | 11/1905 | Duffy | 4/287 |
| 831,767 | A | * | 9/1906 | Boden | 4/287 |
| 1,023,645 | A | * | 4/1912 | Hamilton | 99/410 |
| 1,189,498 | A | * | 7/1916 | Sesler | 99/410 |
| 1,196,644 | A | * | 8/1916 | Beetlestone | 99/418 |
| 1,273,119 | A | * | 7/1918 | Allis | 99/418 |
| 4,477,705 | A | * | 10/1984 | Danley et al. | 219/731 |
| 4,714,012 | A | * | 12/1987 | Hernandez | 99/444 |
| 5,265,281 | A | * | 11/1993 | McAlpine | 4/287 |
| 7,172,705 | B2 | * | 2/2007 | Cooper | 210/776 |
| 7,185,766 | B2 | * | 3/2007 | Cooper | 210/533 |

* cited by examiner

*Primary Examiner* — Thomas M Lithgow
(74) *Attorney, Agent, or Firm* — Jon Fallon, Esq.; Michael P. Kochka, Esq.

(57) ABSTRACT

A device and a method for removing a liquid, foam, fat or other solid or liquid material or anything else that a user wants to remove or separate from a remaining liquid or solid that is left in a container.

20 Claims, 16 Drawing Sheets

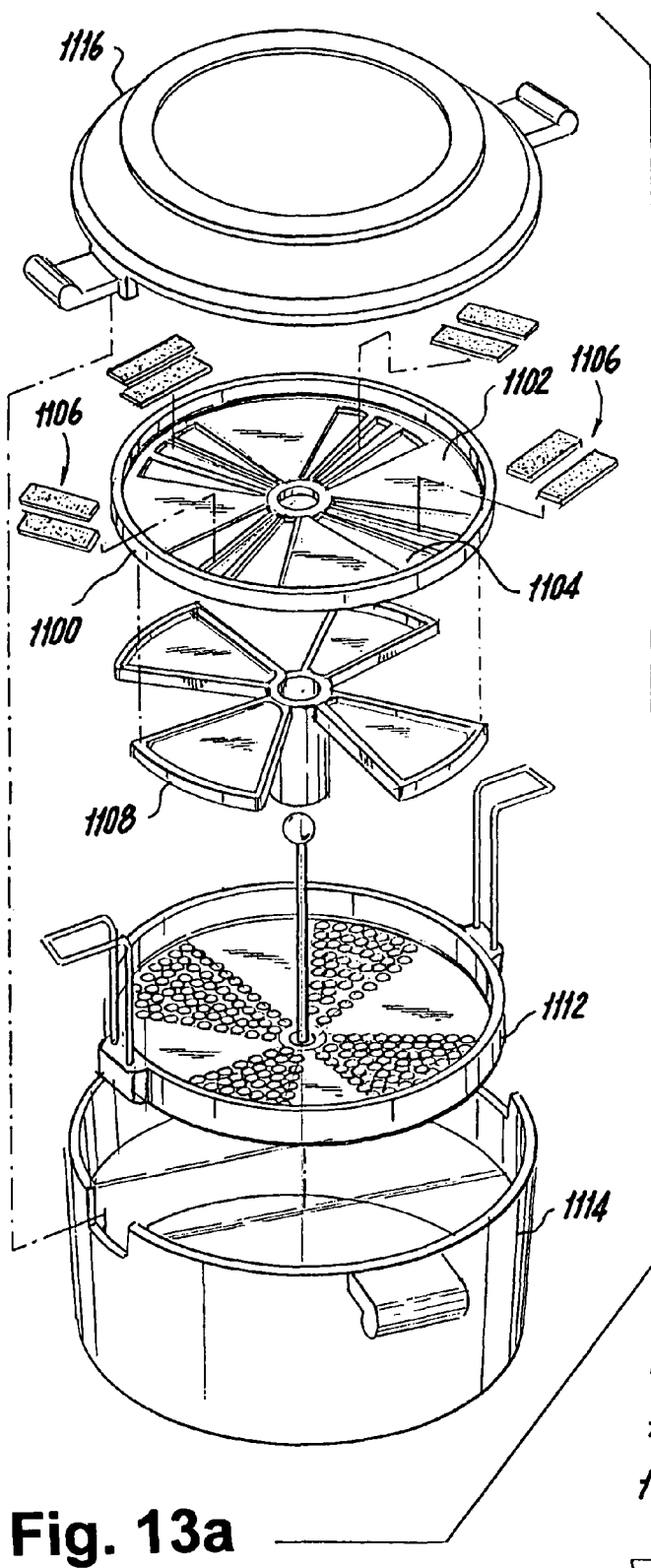
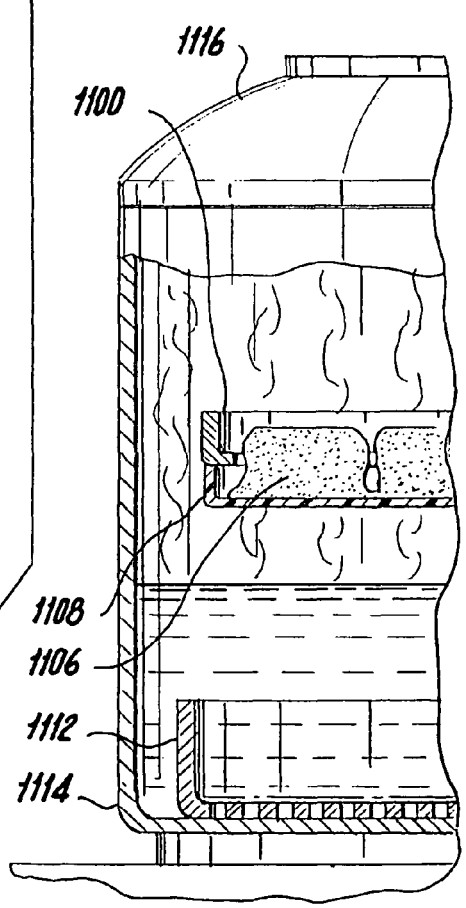
Fig. 13a
Fig. 13b

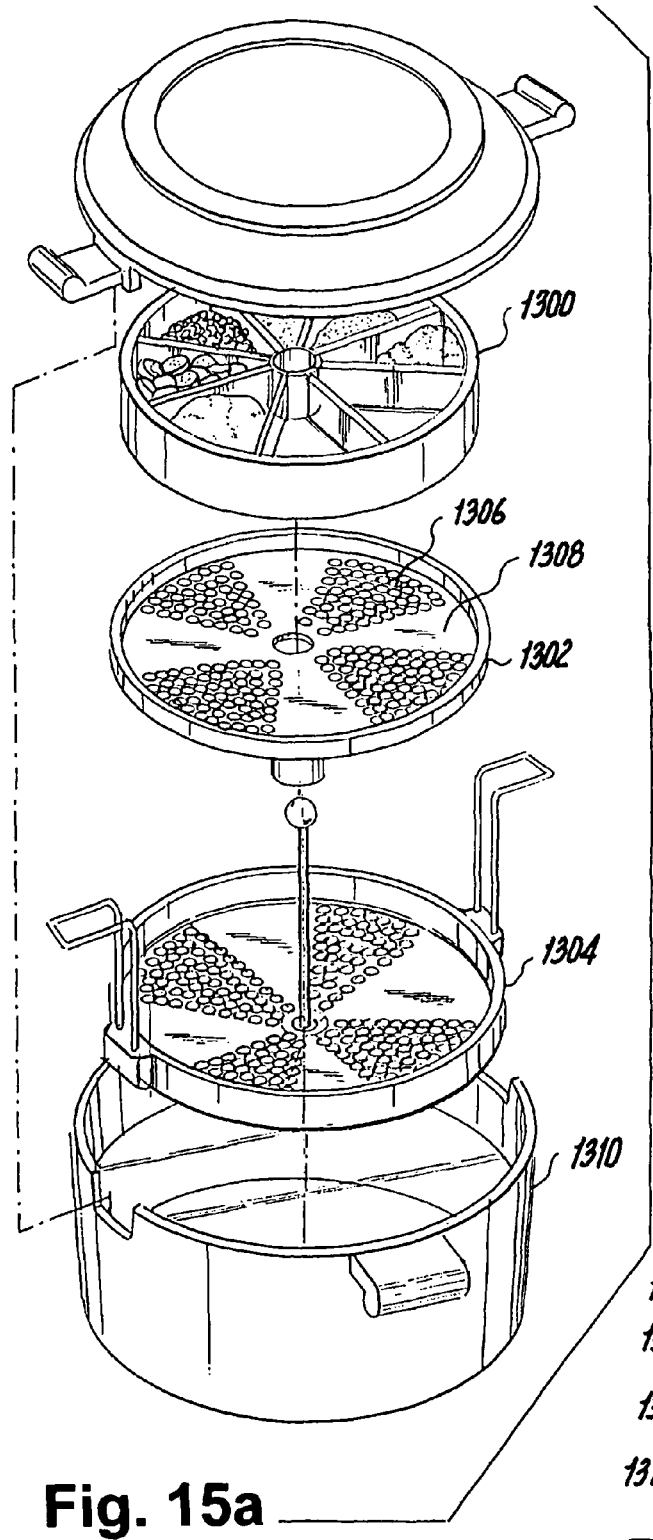
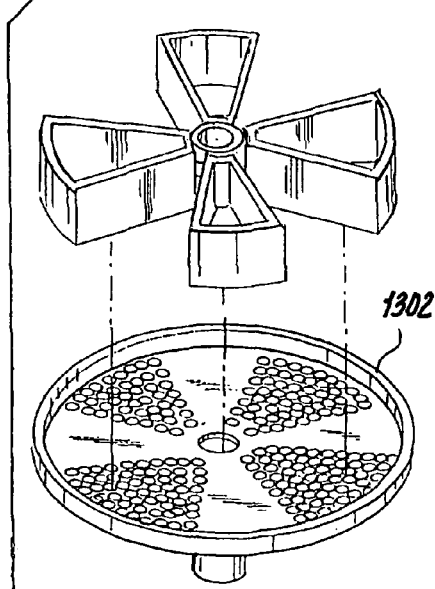
Fig. 15b
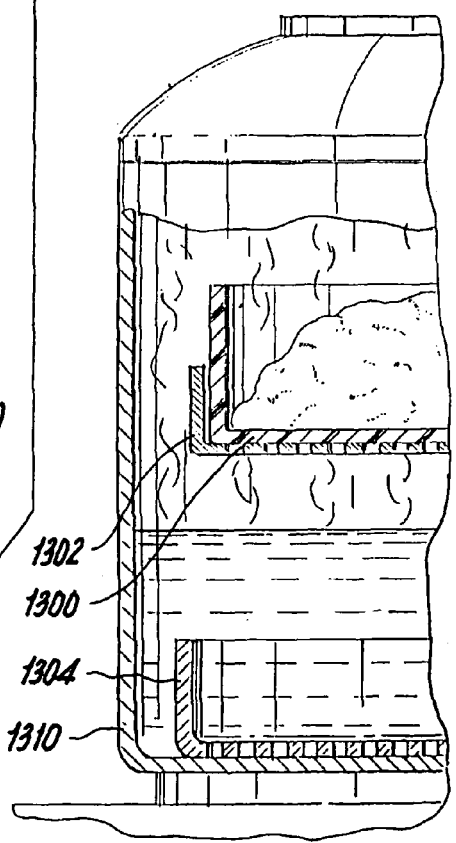
Fig. 15a
Fig. 15c

US 8,900,451 B2

DEVICE AND METHOD FOR REMOVING SOLIDS AND LIQUIDS FROM A POT

RELATED APPLICATIONS

The present application is a continuation-in-part of application Ser. No. 11/377,111 filed Mar. 16, 2006 which is a continuation of application Ser. No. 11/042,711 filed Jan. 25, 2005 which claims priority to provisional patent application Ser. No. 60/563,507, filed Apr. 18, 2004.

FIELD OF THE INVENTION

The present invention relates to a device and a method for removing a liquid, foam, fat or other solid or liquid material or anything else that a user wants to remove or separate from a remaining liquid or solid that is left in a container.

BACKGROUND OF THE INVENTION

U.S. Pat. No. 5,077,900 relates to a fat skimmer in the form of a ladle having a deep vessel bowl with a rim at which there are ports for the transfer of surrounding fatty liquid into the vessel, determined by manipulation controlled by a locator associated with the rim.

U.S. Pat. D252,068, D493,070 and D357,389 relate to fat skimmer devices. to a fat skimmer for separating an unwanted fat liquid from a wanted liquid. The device consists of a transparent cone shaped jug for storing the unwanted fat liquid and the wanted fat liquid that is to be separated. The jug has a tapered exhaust conduit formeriphery partially submerged in the liquid body, a fat removal opening is provided in the plate portion co-axially with respect to the axis of rotation of the plate, a spiral shaped fat capture flange extends forwardly from the surface of the plate and has an inner end at the fat removal opening entered in the plate and an outer leading end edge positioned radially outward from the fat removal opening to engage and remove fat from the surface of the liquid body and deliver it to the fat removal opening.

U.S. Pat. No. 6,722,043 and publication application 2003/0188439 relate to a fat skimming ladle to use for removal of fat and other floating debris off of cooked soup stock. The ladle has a conduit structure with inlet located at the interior bottom of the ladle bowl and the outlet is located behind the proximal end of the handle.

The removal of fats, oils and grease floating in pans and pots where meats and pastas are cooked is troublesome. In the past, the process is to pour it off or scoop it off. Spoons, cups and ladles have been used. Hot fats, grease and oil rise and form a uniform layer on underlying liquids during roasting and cooking.

SUMMARY OF THE INVENTION

The present invention relates to a device and a method for removing a liquid, foam, fat or other solid or liquid material or anything else that a user wants to remove or separate from a remaining liquid or solid that is left in the container.

It is an object of the present invention to provide a device and a method for skimming a layer of fat, oil, or other similar layer that is floating on top of another liquid. It is an object of the present invention for the other liquid to be water or soup or other similar substance. It is an object of the present invention for the device to be placed in a pot or other container. It is an object of the present invention for the device to be used to skim a layer of foam, such as that formed at the top of a pot of cooked pasta, from the surface of a liquid. It is an object of the present invention for the invention to comprise a flange around the outside to prevent the device from dropping to the bottom of the pot. It is an object of the present invention for the device to be made of different sizes so that it can fit into different size pots. It is an object of the present invention for the device to expand and contract to be able to fit into different size pots. It is an object of the present invention for the device to have additional parts which could be added to it to expand the diameter of the device so that it can fit into different size pots.

The present invention relates to a utensil which comprises a strainer, a reservoir, which may be constructed as an integral piece with the strainer, a stopper, a handle, and a stopper control rod. The size of the skimmer closely matches the size of the pot that it will be use with. It is an object of the present invention for the strainer to be available in different sizes or adjustable to accommodate different size pots.

The strainer is the portion of the skimmer with holes in it to permit entry of fat, liquid or foam or other similar substance but keeps out solids such as vegetables. The surface of the strainer is held parallel to the surface of the liquid to be skimmed. It is an object of the present invention for the strainer to be of a circular shape. It is an object of the present invention for the diameter of the strainer to closely approximate, but be slightly less than, the diameter of the pot that is being skimmed.

The reservoir is the portion of the skimmer that holds the fatty liquid, foam, or other similar substance that is removed from the pot. It is made from the side wall of the utensil, working in conjunction with the bottom of the utensil, formed by the combination of the strainer and stopper. In the prior art, the reservoir is in a location that is separated from the strainer holes, the fat enters the strainer holes and runs off into a separate reservoir. It is an object of the present invention for the reservoir to be collocated with the strainer holes, located in the same place where the fat enters from the strainer.

The stopper is the rotatable, slidable, or otherwise positionable piece of material that opens the holes in the strainer to permit the ingress of the liquid, fat, foam or other similar material to be removed, or alternatively close the holes in the strainer, allowing the skimmed liquid to be retained in the reservoir without draining out through the holes in the strainer. It is an object of the present invention for the stopper to be positioned above or below the strainer. It is an object of the present invention for the stopper to sit above the strainer within the reservoir. The holes in the stopper are the same size and in the same relative position as the holes in the strainer, when the stopper is aligned in the open position. When the stopper is moved or rotated into the closed position, the solid portions of the stopper completely block the holes in the strainer. The surface of the stopper forms a tight seal against the surface of the strainer in the closed position, to prevent leakage of liquid from the reservoir when the skimmer is withdrawn from the pot. It is an object of the present invention for the stopper to be rotated or slid into position via the action of the stopper control rod. It is an object of the present invention for the stopper to comprise a thin, round, plate made of either a hard material, such as metal or plastic, or of a gasket-like material, with an array of holes matching the holes in the strainer.

It is an object of the present invention for the center of the stopper to be aligned with the center of the strainer, via a common pivot point. It is an object of the present invention for the stopper to be made from a plurality of solid hole plugs that may be lifted above or lowered into the holes in the strainer in tandem in order to open or close the strainer.

The handle is used for lowering the skimmer into the pot and for holding it in position first with the stopper open and then when the stopper is closed. The handle is also used for removing the skimmer from the pot in order to remove the liquid, fat, foam or other similar substance. It is an object of the present invention for the handle to be long enough so that the skimmer may be placed onto the surface of the liquid in the pot, whether the pot is full or only partially full.

The stopper control rod is the mechanism used to position the stopper in the open or closed position. It is an object of the present invention for the stopper control rod to rotate, lift or drop the stopper into the proper position. It is an object of the present invention for the stopper control rod to be an integral part of the handle. It is an object of the present invention for the rod to have a knob at its top to assist the user in rotating or changing the position of the rod. It is an object of the present invention for the rod to slide, click, snap, rotate or drop the stopper into alignment.

It is an object of the present invention for the component pieces of the skimmer to be disassembled to permit easy cleaning.

The present invention relates to a method for skimming a liquid, foam or other similar substance which floats on top of another liquid comprising: opening the stopper by aligning the stopper holes with the strainer holes. The device is then partially lowered via a handle into a container of liquid, using the handle to hold the bottom of the skimmer just below the top surface of the liquid. This forces the top layer of liquid up through the holes in the strainer at the bottom of the device. The side wall of the reservoir is aligned with the inside wall of the container with only a small clearance between the reservoir wall and the container wall, which keeps the bottom face of the strainer parallel to the top surface of the container's liquid. The top of the liquid enters the reservoir area, which is above and to the sides of the holes in the strainer. When sufficient liquid, foam, fat or similar substance has entered the reservoir, the user rotates, or otherwise positions the stopper via the stopper control rod so that it blocks the holes in the strainer, trapping the liquid, foam, fat or other similar substance within the reservoir. The user then withdraws the skimmer from the container, and disposes of the skimmed liquid, fat, foam or similar substance. The user can repeat the operation to remove any liquid, foam, fat or similar substance that should have been removed.

The present invention can be used at the time of cooking, before adding solid materials such as bones or vegetables to a liquid material that one may want to remove after cooking. In this instance, the user would first place the skimmer into a pot, either with or without the liquid in the open position. The user could then add the solid materials such as bones or vegetables or meats (as in preparing a gravy) and commence with the cooking of the liquid. Once cooked, the skimmer can be removed in the open position allowing for the removal of the solids from the liquid.

It is an object of the present invention that the device while being used in the open manner where liquid can pass through the device be placed in a pot before or after water is added to the pot. A food item such as pasta, or any vegetables which need to be removed from the water are then placed in the pot. The food item is then cooked and the device is removed with the food item in it. It is an object of the invention for the water to be drained from the food, and then if the user wishes to add butter or another topping to the food item to be added which can be drained from the item through the holes in the bottom of the device. It is an object of the invention for the device to be closed after draining any unwanted toppings from the food. When the device is closed, it can then be used to serve the food item. In this way the device serves as a serving piece. It is an object of the present invention for pieces to be added to the device to allow it to serve as a bowl or other type of serving piece.

It is an object of the present invention for the device to spin to assist in coating any food items in the device and also to remove any excess product from the food item.

It is an object of the present invention for the device to be made of stainless steel. It is an object of the present invention for the device to be made of a microwaveable polymer.

It is an object of the present invention for the device to be used to be placed in a pot having boiling liquid and a food item, remove the food item from the liquid and drain the food item of any liquid, and then place the device and food item together into a device for frying the food item in the device. Examples of items to be boiled and then fried, are chicken, ravioli. The device can also be used to just fry a food item from scratch.

The present invention relates to a separator which can be used in existing pots or can be used with the device of the present invention. When used with existing pots, the separator divides a pot into compartments, so that different food items can be cooked within one pot and the contents of each compartment are not mixed.

It is an object of the present invention to use the separator with the device of the present invention so that water can be added to the pot. Different food items are added to each compartment, and then the water is brought to a boil. For example, different types of pasta can be placed in each compartment, or different types of vegetables can be placed in each compartment, and cooked separately within one pot.

It is an object of the present invention for the device to have a section which can be removed from the device so that certain solid items stay in the pot and other items are removed from the pot by the device once the cooking is over. For example when making chicken soup, a user may wish to keep carrots in the soup, but want the chicken and any other items removed from the pot. In this instance the carrots would be placed in the section of the device wherein the carrots can be left in the pot while the other items are removed after cooking. This can be very useful in removing items which are used for cooking and cannot be eaten such as bay leaves.

It is an object of the present invention for the device to be able to be used in a conventional oven. It is an object of the present invention for the device to be made of a material which can be used in a microwave oven.

It is an object of the present invention for the device to act as a steamer.

It is an object of the present invention for the device to be hung over the edges of the pot, and be able to be hung at different depths in the pot.

It is an object of the present invention for the device to be placed in a pot which has internal ridges which can support the device at different depths within the pot.

It is an object of the present invention for the device to expand once it is in the pot and be wedged against the sides of the pot to be kept at a certain depth within the pot.

It is an object of the present invention for the device to be able to be applied in two tiers. In one embodiment, the food would be placed in the top tier, while in the bottom tier would be wood chips for smoking/grilling. In a second embodiment, the two tiers can be placed in the pot wherein in the bottom tier can be placed items that are to be removed from the bottom of the pot, and in the top tier is placed just below the fat line to remove the fat from what is cooked.

BRIEF DESCRIPTION OF DRAWINGS

FIG. 12b shows a cross section of the device shown in FIG. 12a.

FIG. 13a shows the device of the present invention used for melting.

FIG. 13b shows a cross section of the device shown in FIG. 13a.

FIG. 14b shows a cross section of the device shown in FIG. 14a.

FIGS. 15a and 15c show the device of the present invention divided into sections.

FIG. 15b shows a cross section of the device of FIG. 15a.

FIG. 16b shows a cross section of the device of FIG. 16a.

DETAILED DESCRIPTION OF THE INVENTION

Figure 1:
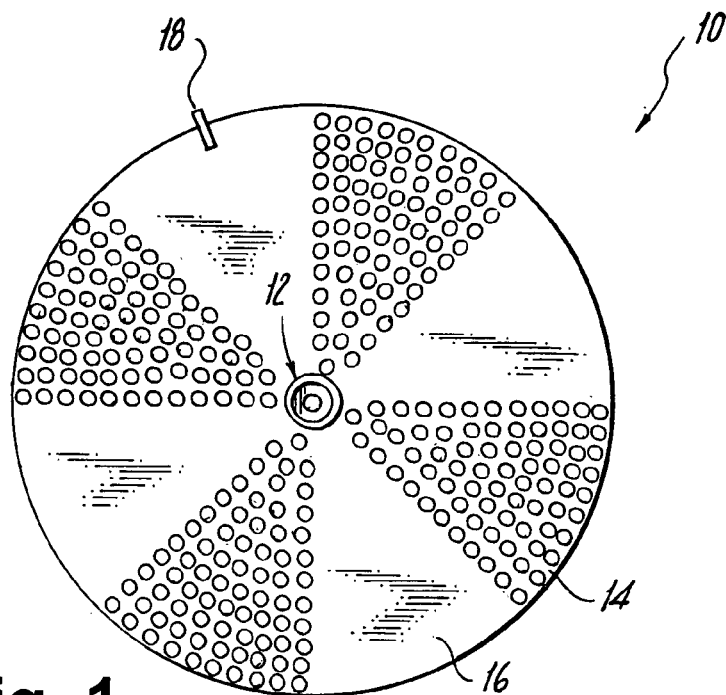
FIG. 1 is a plan view of the present invention.

FIG. 1 shows a skimming device 10 being of a round or circular shape having a center pivot pin 12, strainer holes 14 and solid area 16. The device further comprises a mechanical rotation stop 18. The device 10 can be divided into a different number of segments which have various hole sizes or shapes.

Figure 2:
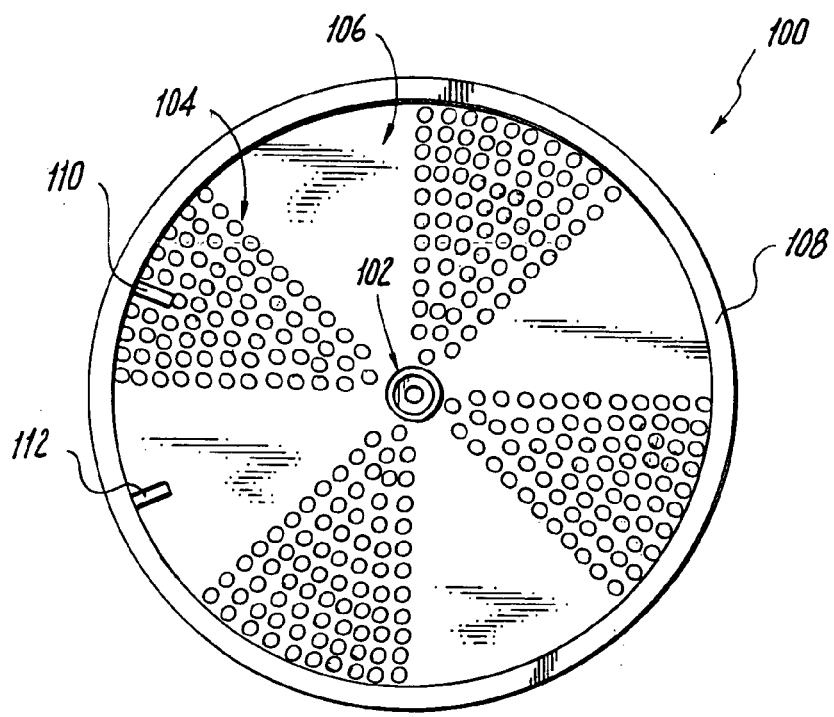
FIG. 2 is a plan view of the present invention.

FIG. 2 shows a skimming device 100 having a center pivot hole 102, strainer holes 104 and solid area 106. FIG. 2 further comprises a reservoir wall 108. The mechanical stops 110 and 112 limit the rotation of the device 100.

Figure 3A:
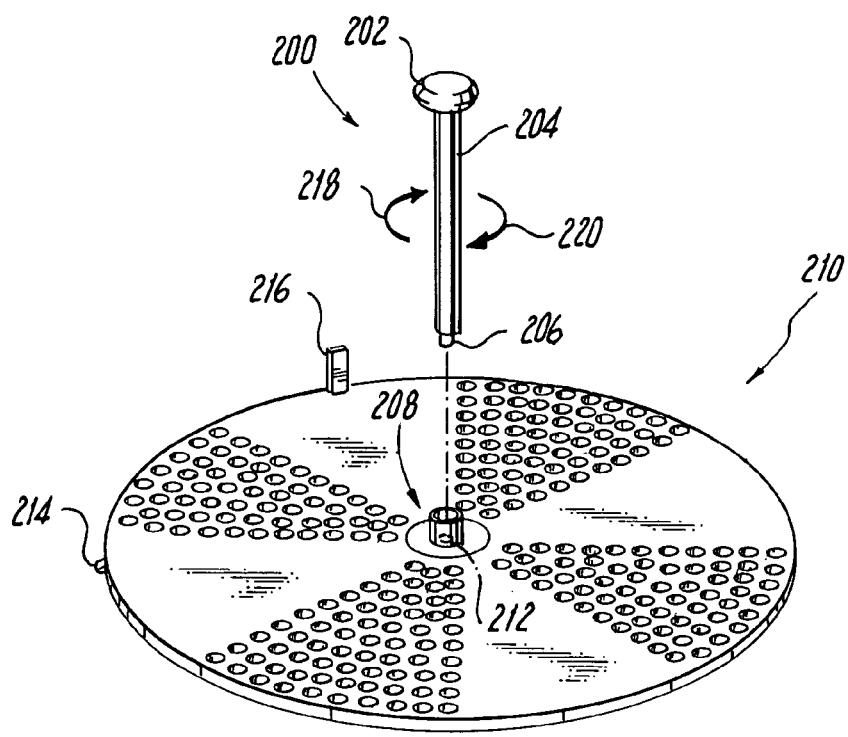
FIGS. 3a and 3b show the stopper control rod of the present invention.

FIG. 3a shows a stopper control rod 200 comprising a handle 202, rod 204 and a key 206 which is inserted into the flange seat 208. The flange seat 208 is for a fixed or removable stopper control rod. Skimming device 210 has a pivot 212 which is located under the center of the flange. Skimming device 210 also has a stopper 214 and a mechanical rotational stop pin 216. The device is opened by turning the device following arrow 220 and closed following arrow 218.

Figure 3B:
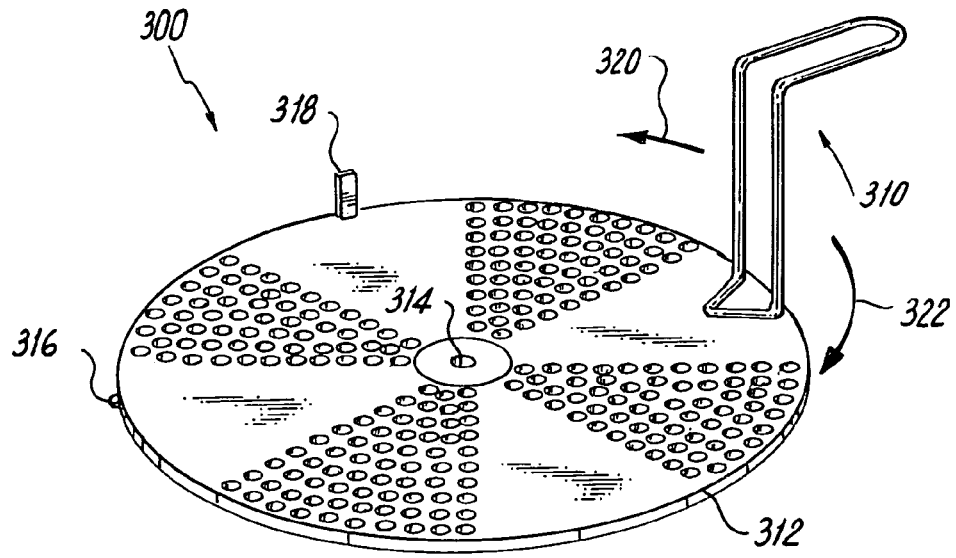

FIG. 3b shows device 300 having a wire handle shaped stopper control rod 310. The stopper control rod 310 can be welded or otherwise affixed, or removable from the skimmer 300. The pivot 314 is under the center of the stopper 310. The skimmer has stopper 316 and a mechanical rotational stop pin 318. By turning the device in the direction of arrow 320, the holes in the device remain open. By turning the device in the direction of arrow 322 the holes in the device close.

Figure 4:
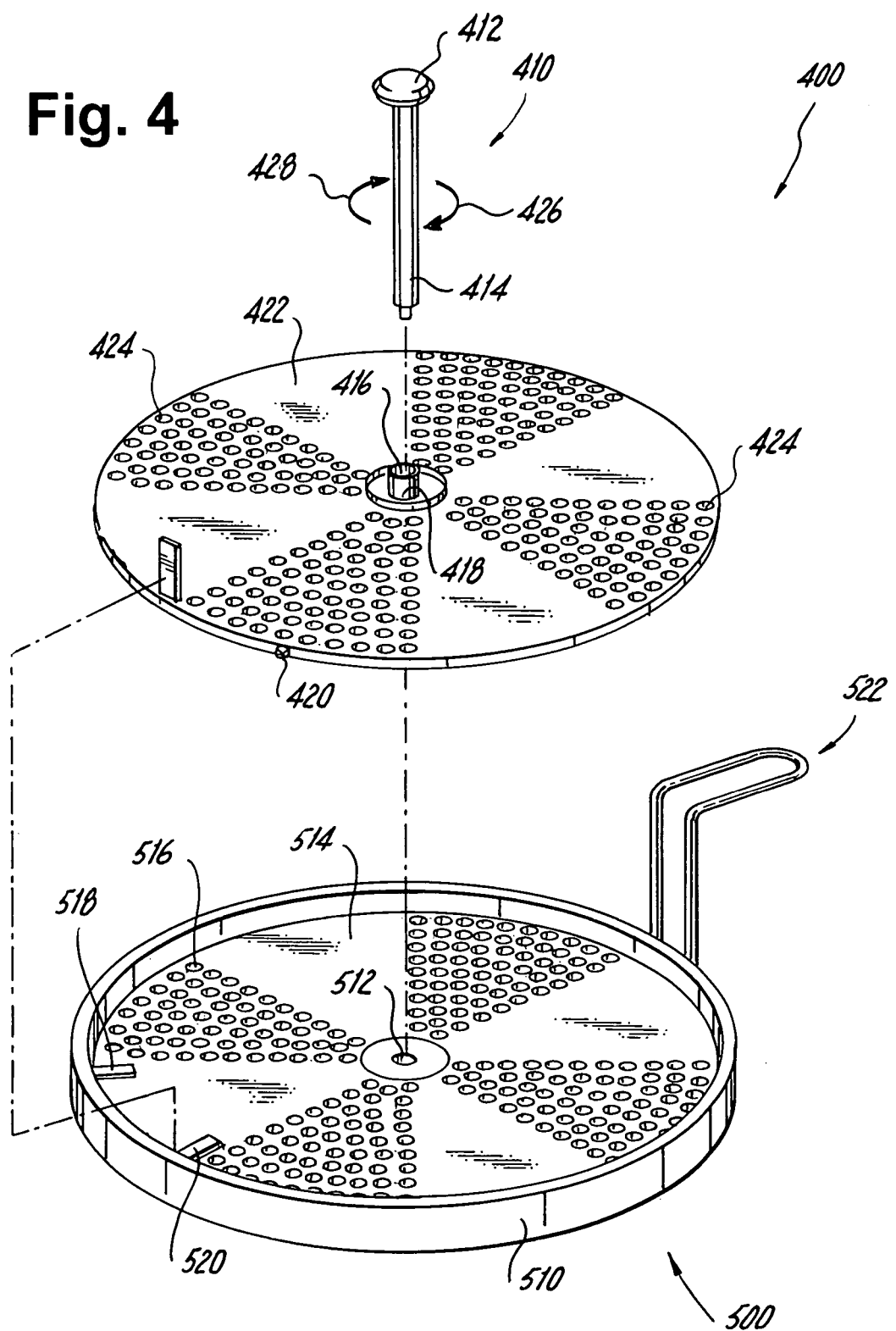
FIG. 4 is an exploded view of the present invention.

FIG. 4 shows an exploded view of the device 400. The device comprises a stopper control rod 410 which comprises a rotation knob 412 and a rod 414. The top of the device has a flange with socket 416 located at the pivot 418. The top of the device further has a stopper 420, solid area 422 and holes 424. The rotation knob opens in arrow direction 426 and closes in arrow direction 428. The reservoir part 500 of the device comprises a strainer with integral reservoir wall. The reservoir has a reservoir wall 510 and a pivot 512. The lower portion of the device further comprises a solid area 514 and strainer holes 516. The device has mechanical stops 518 and 520 extending from reservoir wall 510. A handle 522 is attached to the wall of the reservoir.

Figure 5A:
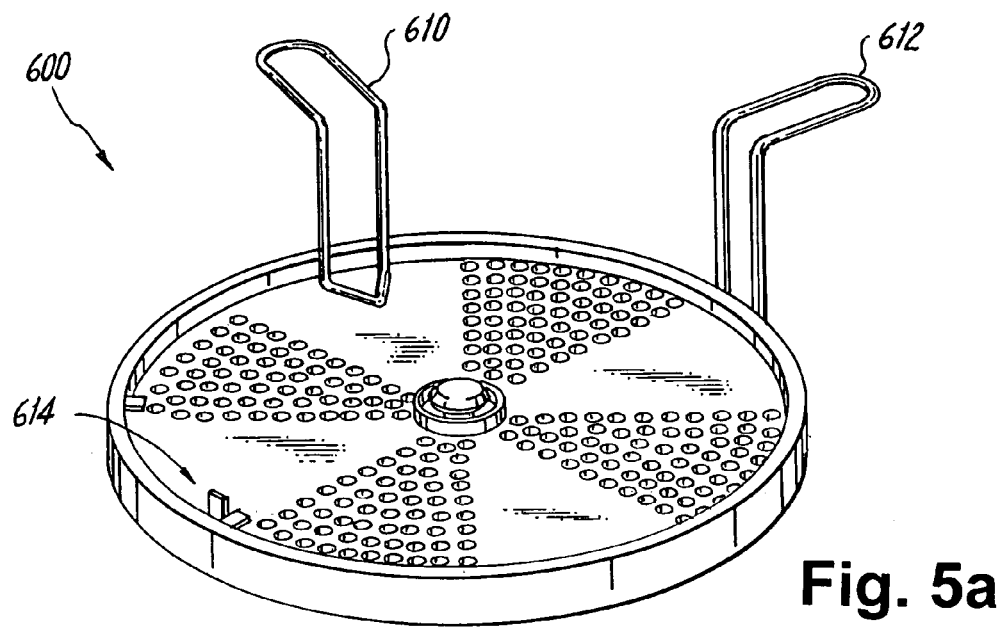
FIGS. 5a and 5b shows an example of how the device works.
Figure 5B:
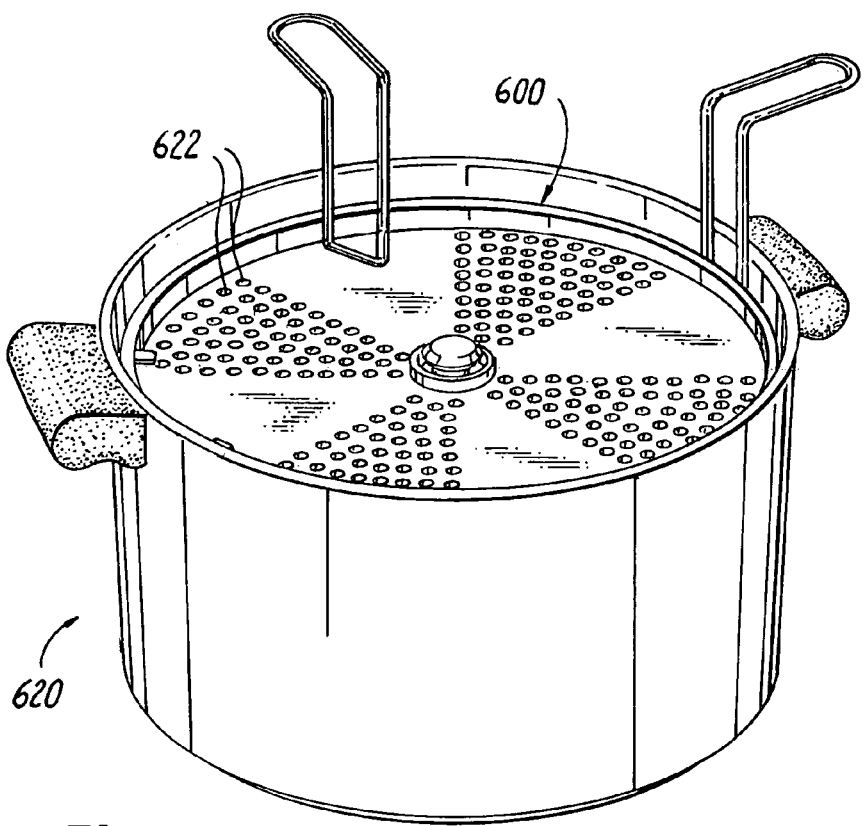

FIGS. 5a-b show the skimmer strainer device 600 having a stopper control 610 in the open position, a handle 612 and a mechanical stop 614 also in the open position. The skimmer strainer device 600 is lowered into pot 620. A layer of fat or other similar solid or liquid is located at the top of the liquid in the pot 620. The liquid enters through the holes 622. The stopper control 610 is then rotated to close the holes forming a solid area wherein the fat or other similar solid or liquid is trapped within the reservoir. The skimmer strainer device 600 is then removed from the pot 620 removing the fat or other similar solid or liquid from the pot. The process can then be repeated if necessary.

Figure 6A:
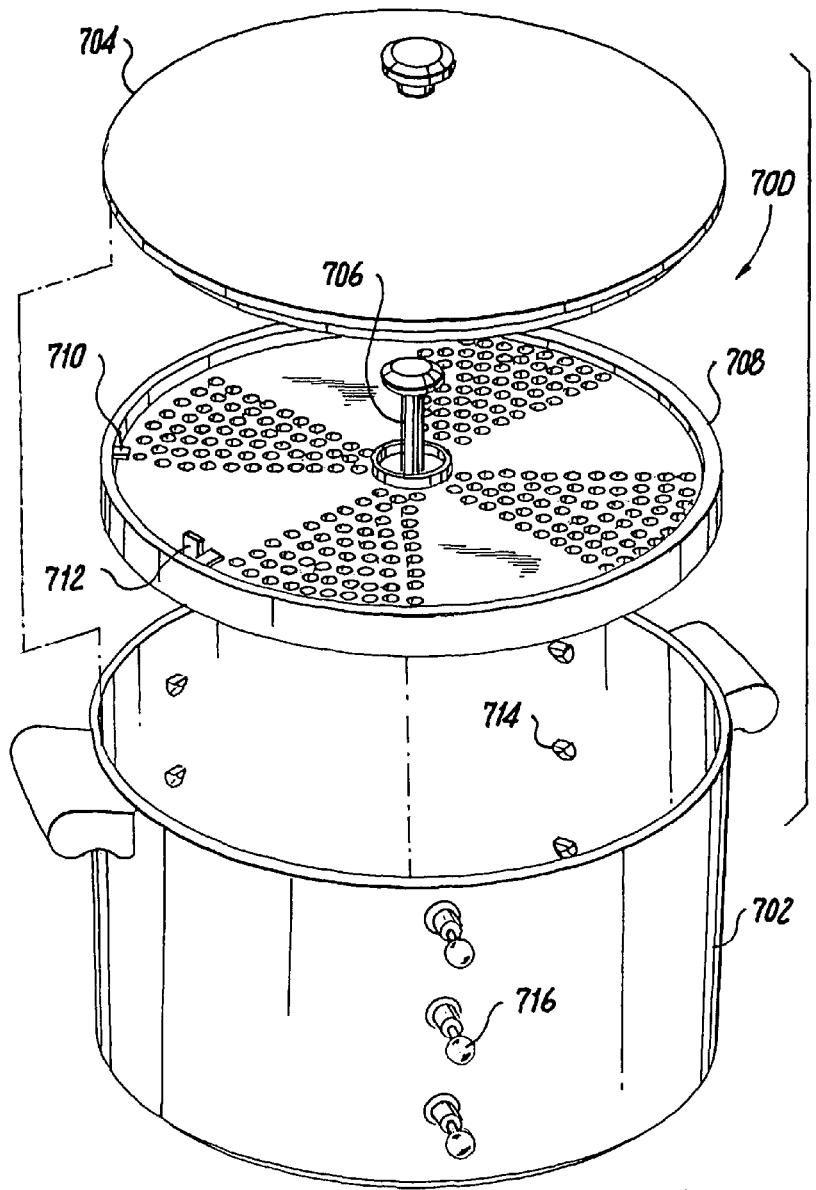
FIG. 6a shows the device in a pot which is constructed to be used with the device of the present invention.
Figure 6B:
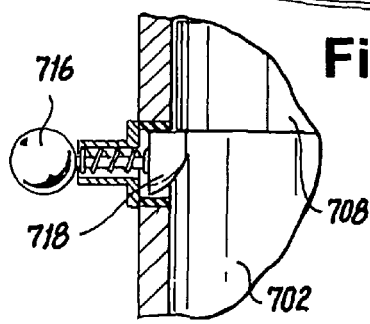
FIGS. 6b and 6c shows the knobs on the pot of FIG. 6a in the holding or non-holding position.
Figure 6C:
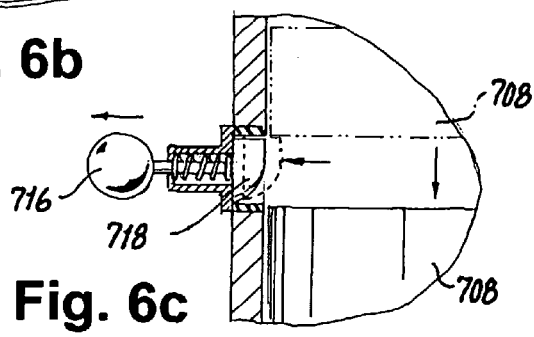

FIG. 6a-6c shows the device 700 of the present invention used with a pot 702 designed to support the device 700. The pot can have a cover 704. The device has the stopper control rod 706, and reservoir wall 708. The device has mechanical stops 710 and 712 extending from reservoir wall 708. The pot 702 has internal slots 718 with protrusions 714 that can be pushed out by knobs 716 to extend inside the pot to form a level to hold the device within the pot. The slots 718 are placed at different levels within the pot 702, and placed at least at 2 locations on the same level. FIG. 6b shows the protrusion 714 pushed out to hold the bottom of the device 700. FIG. 6c shows the protrusion 714 within the slot 718.

Figure 7A:
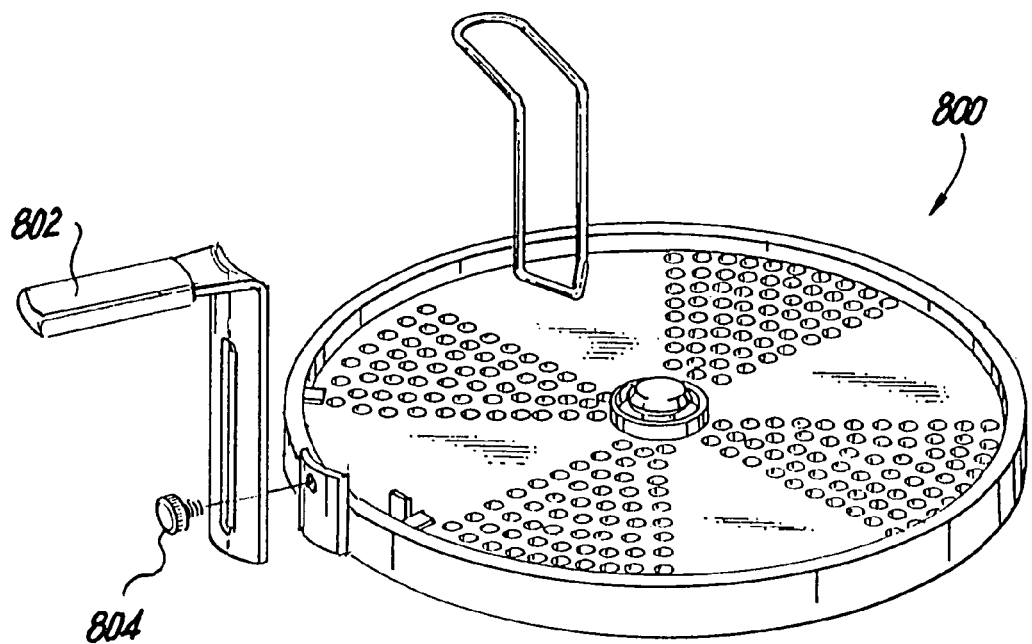
FIGS. 7a and 7b show the device of the present invention having an adjustable handle.
Figure 7B:
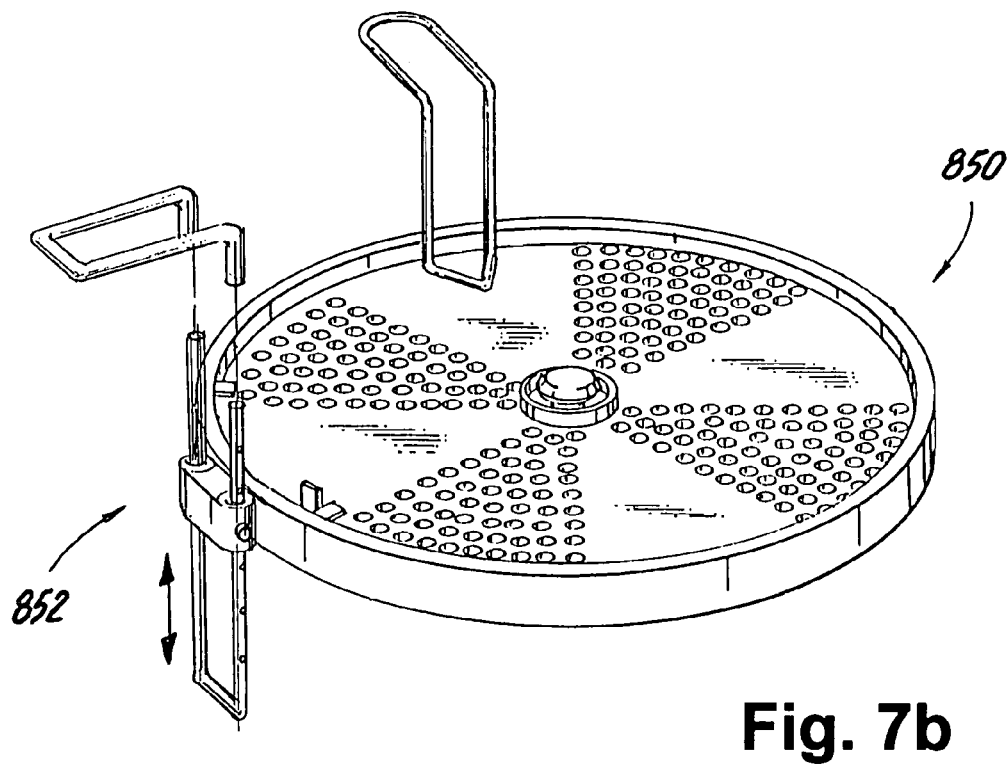

FIGS. 7a and 7b show the device of the present invention having an adjustable handle. FIG. 7a shows a handle 802 attached to the device 800 by a screw 804 which allows the handle 802 to move up and down to lower and raise the device 800.

FIG. 7b shows the device 850 having a handle 852 attached to it which can hold the device in the pot and keep the device at different levels in the pot. The device can have at least one handle and preferably two handles attached to it.

Figure 8A:
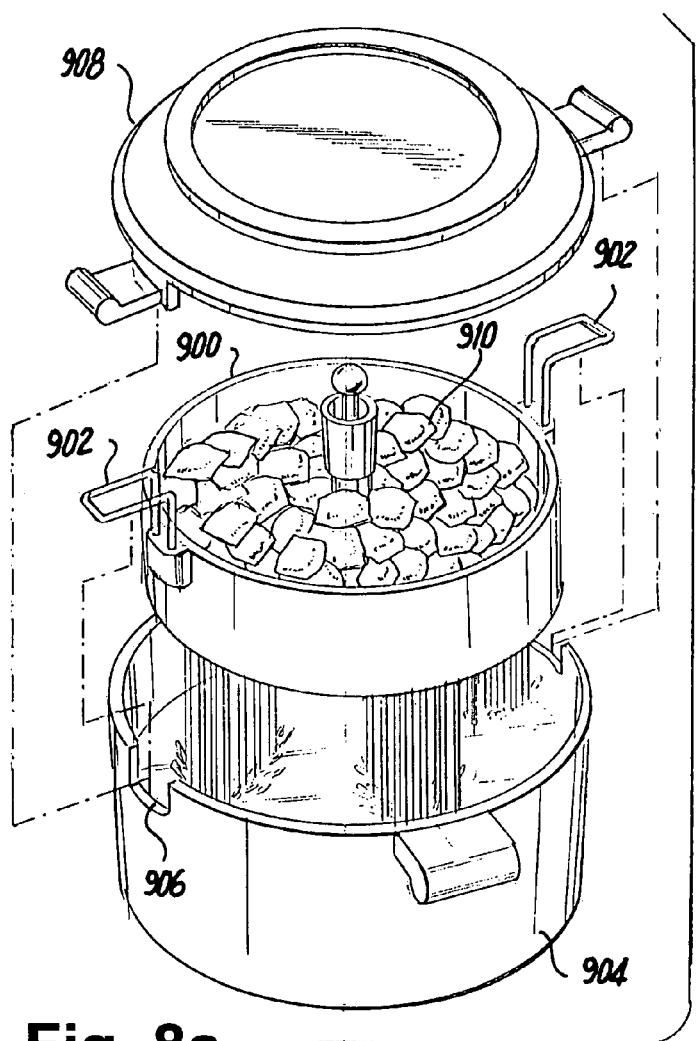
FIG. 8a shows the device of the present invention having food inside it and being placed in a pot.

FIG. 8a shows the device of the present invention having food inside it and being placed in a pot. The device 900 has handles 902 at opposite sides of the device. Pasta is placed inside the device 900. The device 900 is placed inside a pot 904 which has grooves 906 on either side of the pot for receiving the handles 902. A cover 908 can be placed on top of the pot 904.

Figure 8B:
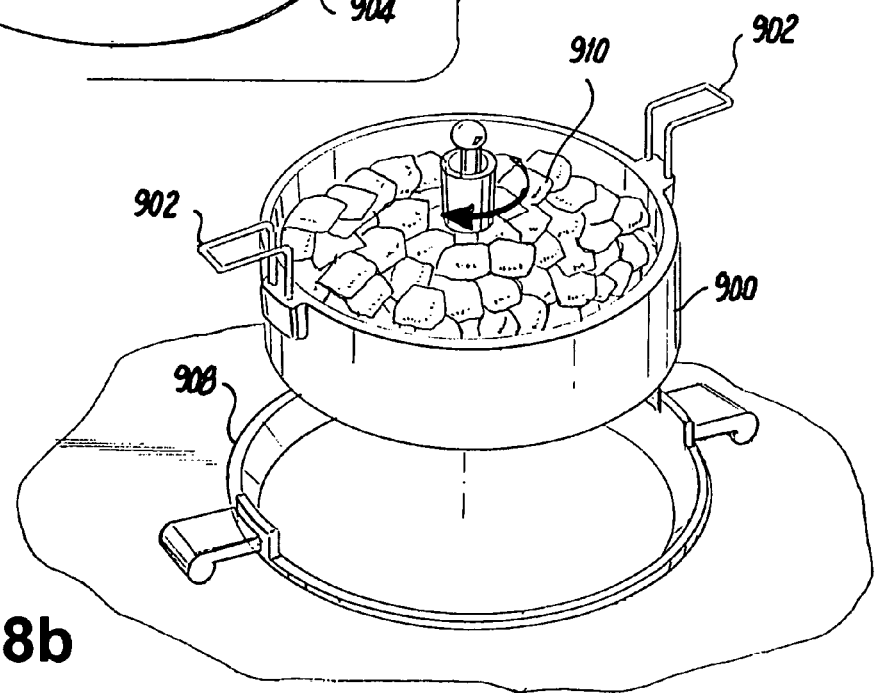
FIG. 8b shows the device of the present invention removed from the pot, and placed in the spinner attachment.

FIG. 8b shows the device of the present invention removed from the pot. Once the device 900 is removed from the pot, the holes can be put in the open position, and the device can be placed in the spinning accessory/bowl so it can be spun as shown by arrow to remove any excess water or any butters or sauces that need to be removed from the food, i.e. pasta.

Figure 8C:
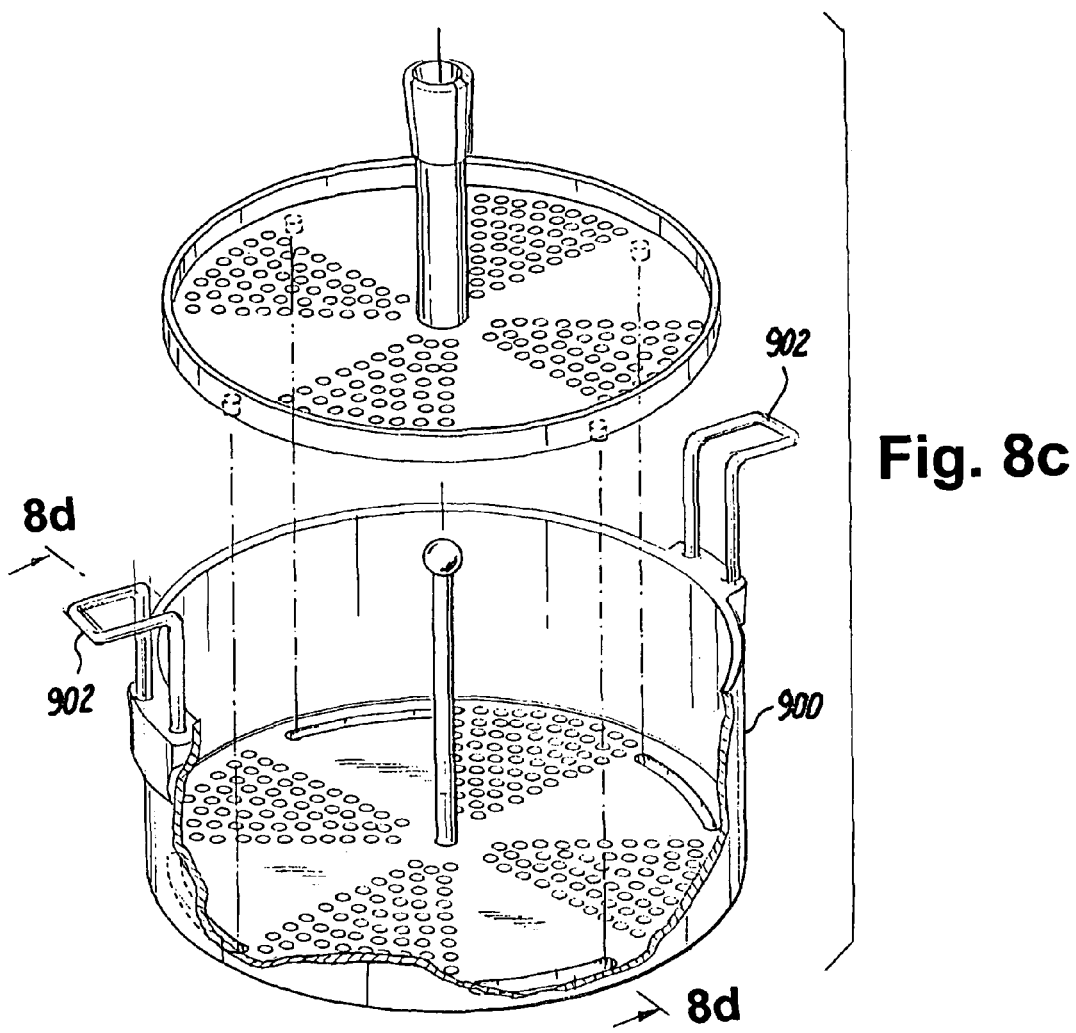
FIG. 8c shows a cross section of the device.
Figure 8D:
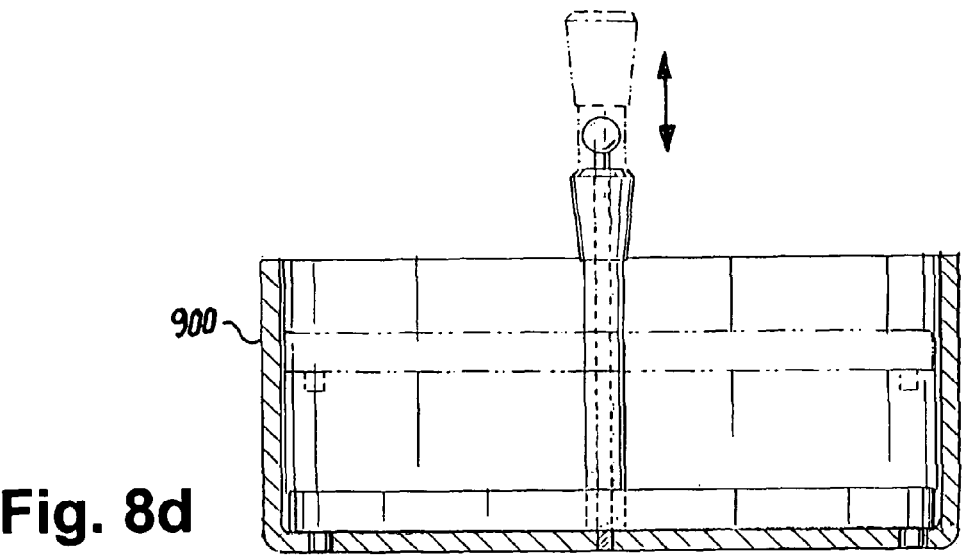
FIG. 8d shows a cross section of the device showing the different levels of the device.

FIG. 8c shows a cross section of the device, wherein the top section is lowered onto the bottom section of the device. FIG. 8d shows a cross section of the device showing the top section lowered onto the bottom section of the device.

Figure 9A:
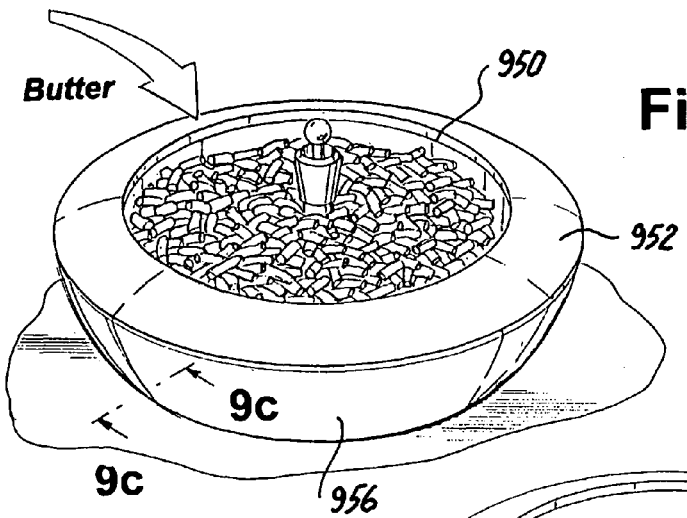
FIGS. 9a-9c show the device being surrounded by a bowl.
Figure 9B:
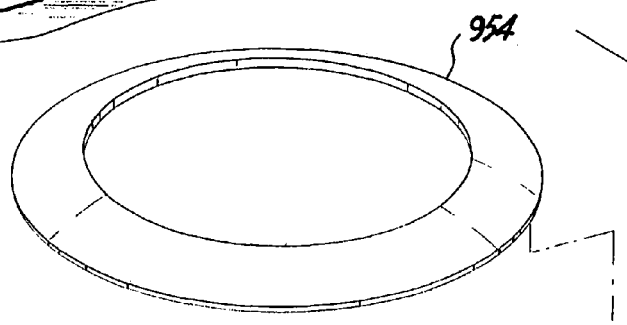
Figure 9C:
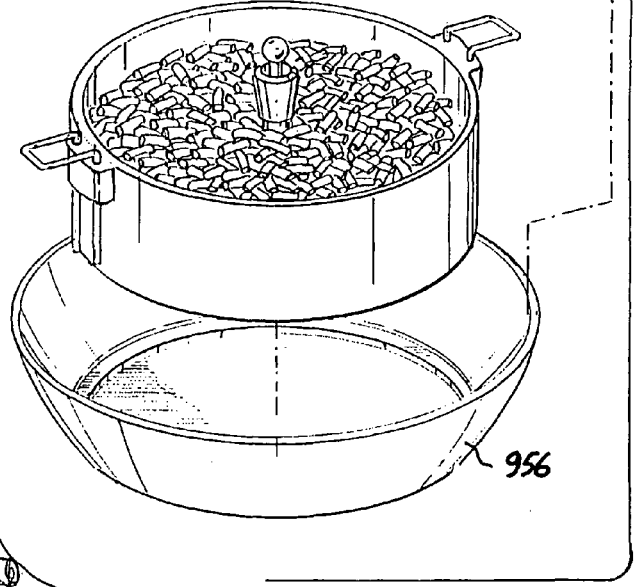
Figure 9C:
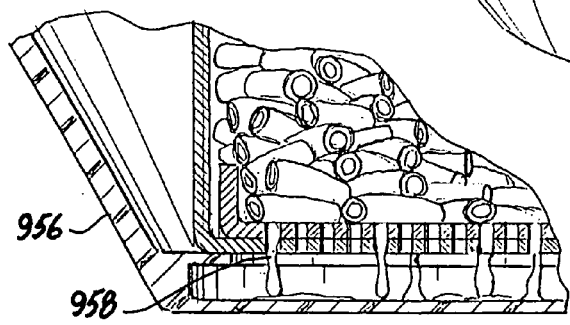

FIGS. 9a-9c show the device being surrounded by a bowl. FIG. 9a shows the device 950 surrounded by a bowl 952. FIG. 9b shows the bowl separated into a top piece 954 and a bottom piece 956 which surrounds the device 950.

FIG. 9c shows a cross-section of the device 950 being within the bowl 952. When the device 950 is in the open position, any excess butter, or sauce 958 that is added to the food can leave the device an food and runoff into the bowl.

Figure 10:
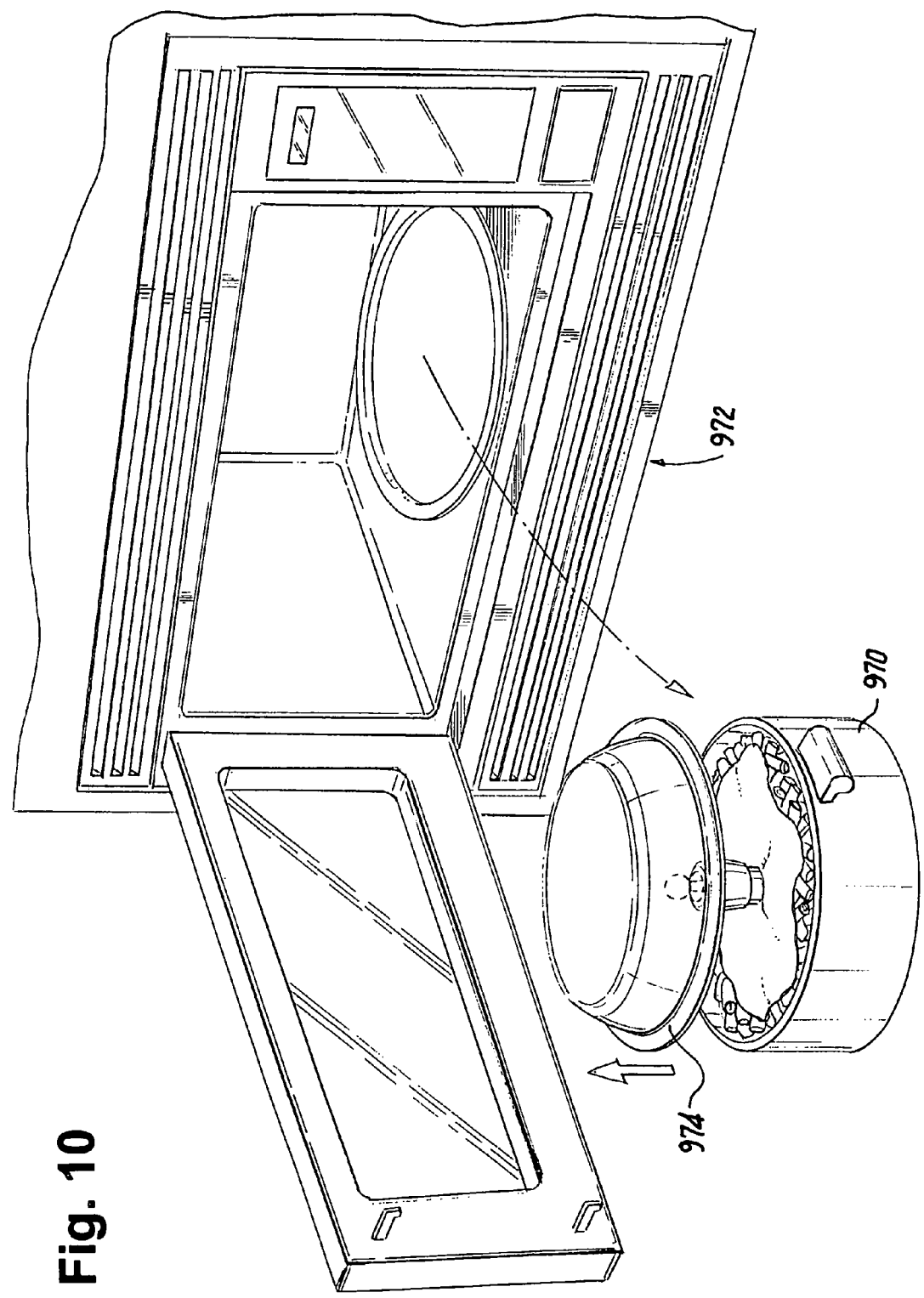
FIG. 10 shows the device being placed in a conventional or microwave oven.

FIG. 10 shows the device 970 being placed in a conventional or microwave oven 972 having an optional cover 974.

Figure 11A:
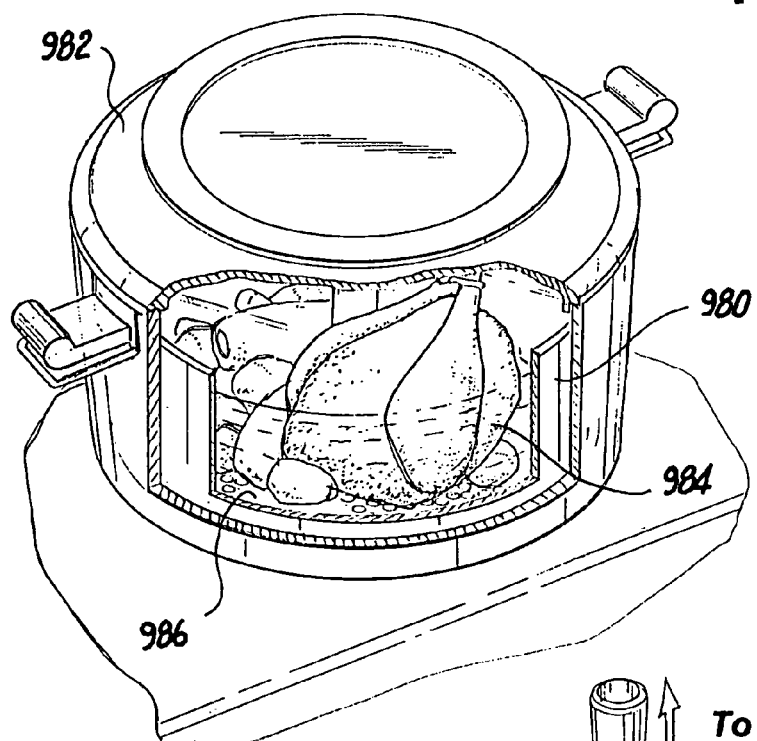
FIG. 11a shows the device of the present invention being placed in a pot.
Figure 11B:
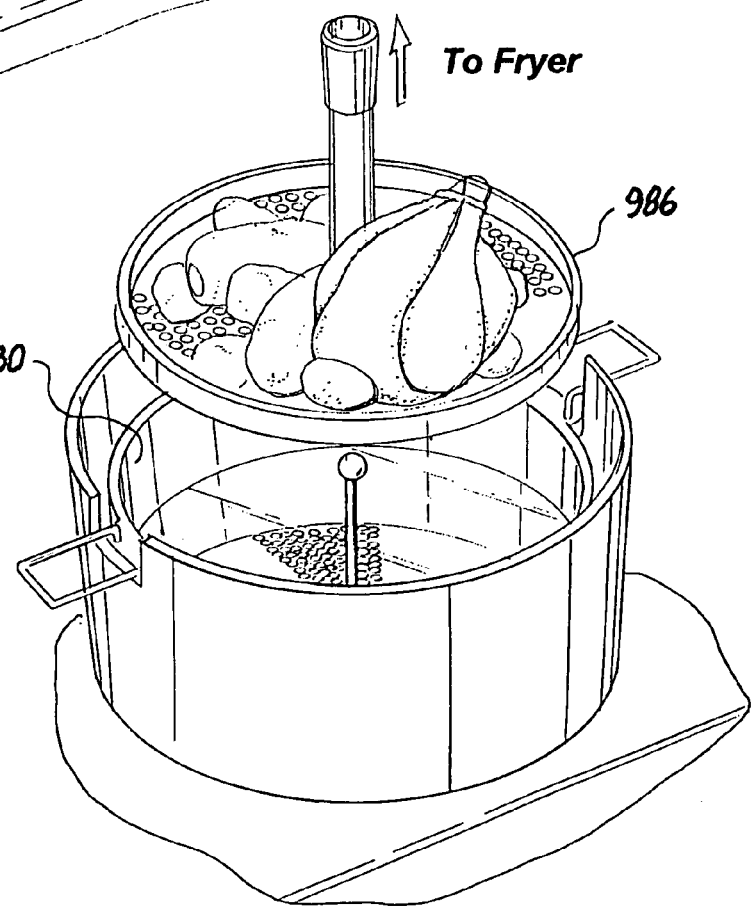
FIG. 11b shows the device the device removed from the pot with the food and being taken to be placed in a fryer.

FIG. 11a shows the device 980 being inside a pot 982 and cooking a chicken 984. The top of the device 986 with the chicken 984 can then be removed and placed in a fryer not shown for then frying the food, i.e. chicken.

Figure 12A:
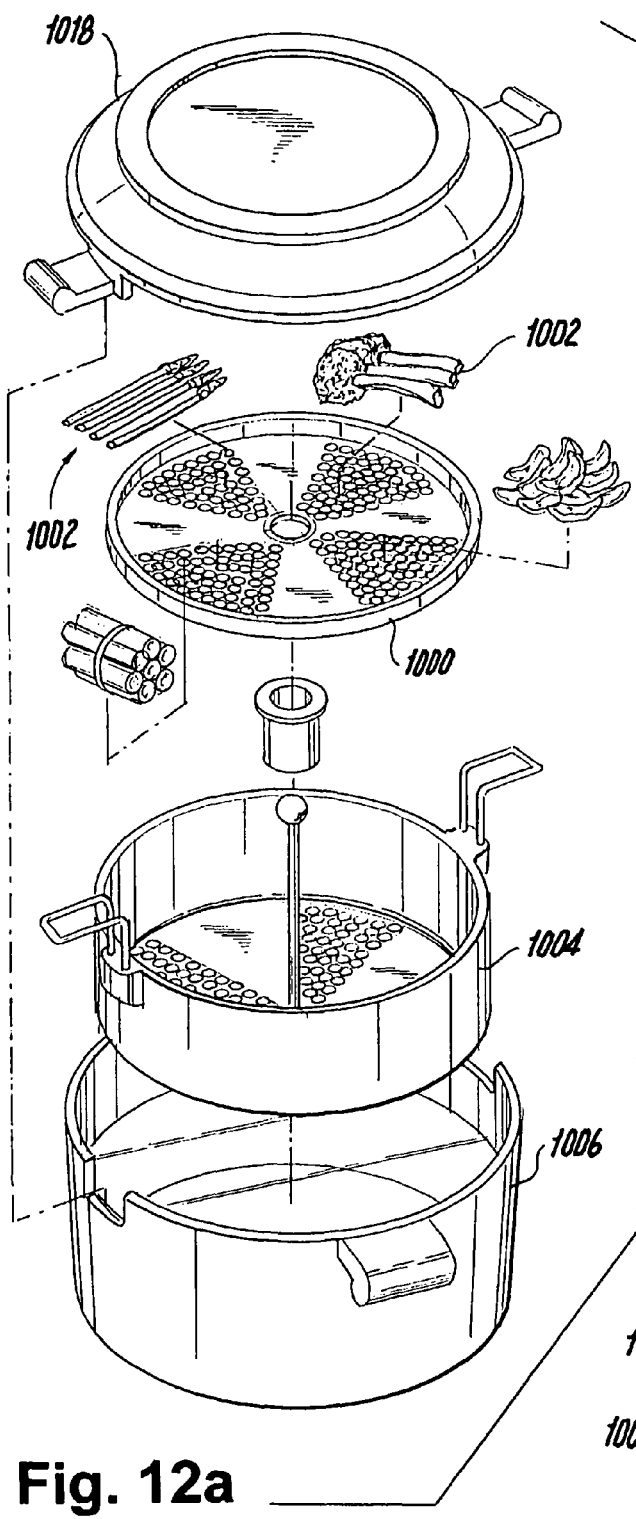
FIG. 12a shows the device to be placed in a pot and used as a steamer.
Figure 12B:
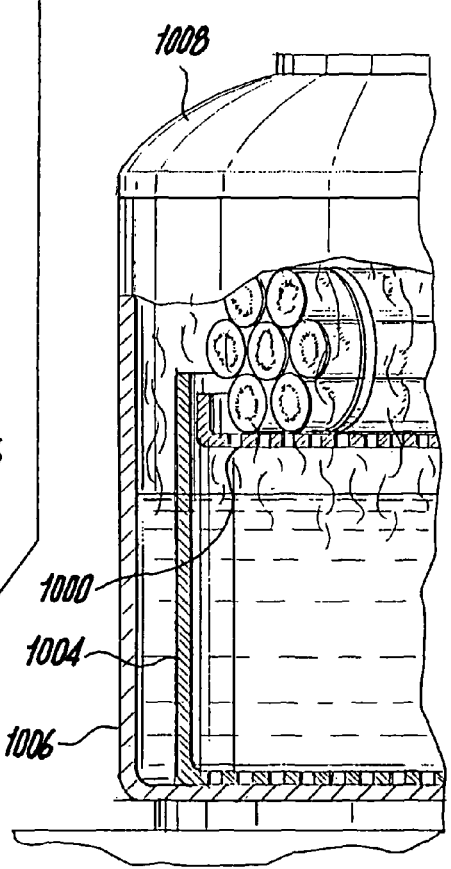

FIG. 12a shows the device to be placed in a pot and used as a steamer. FIG. 12b shows a cross section of the device shown in FIG. 12a.

FIG. 12a shows the top of the device 1000 where the food 1002 is placed. The top of the device 1000 is then placed on the bottom of the device 1004. The device is then placed in a pot 1006, and then the pot 1006 can be covered by cover 1008. FIG. 12b shows the pot of FIG. 12a partly filled with water so that the device can act as a steamer.

FIG. 13a shows the device of the present invention used for melting. The device has a first portion 1100 having a solid portion 1102 and openings 1104. The item to be melted 1106, such as chocolate or bananas, is placed over the opening 1104. A second portion 1108, is placed underneath the openings 1104 to catch the melted food 1106. Both the first portion 1100, and the second portion 1108 are placed on the bottom portion 1112. The bottom portion 1112 allows steam to come through the device to cause the food 1106 to melt. The device is placed in pot 1114, with a cover 1116. FIG. 13b shows a cross section of the device shown in FIG. 13a, showing the steaming action and the food melting.

Figure 14A:
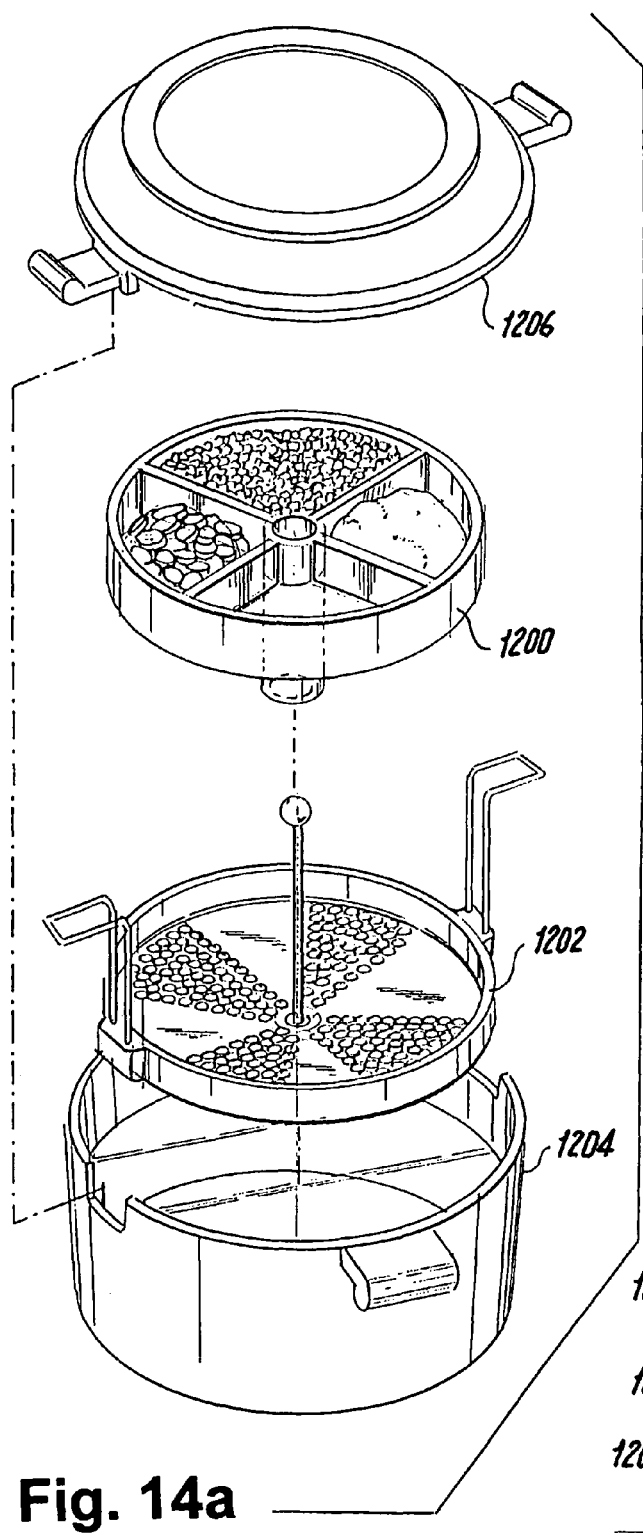
FIG. 14a shows the device of the present invention divided into sections.
Figure 14B:
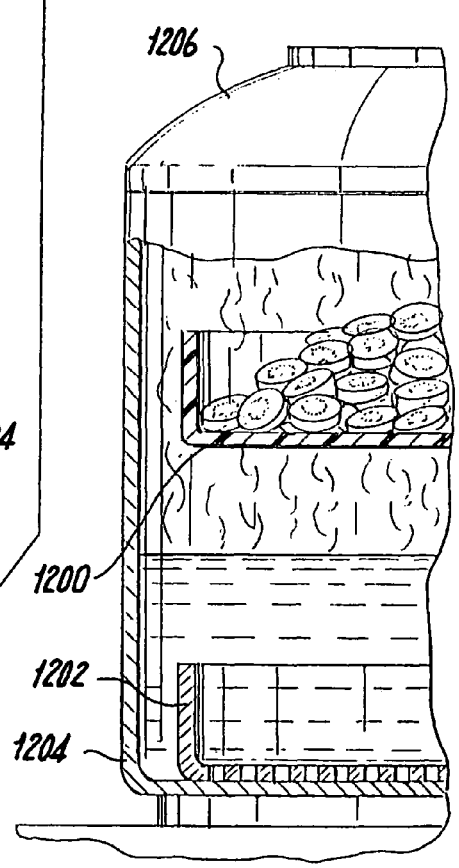

FIG. 14a shows the device of the present invention divided into sections. FIG. 14a comprises a separator 1200 which has some number of dividers, which allows different types of food to be placed in different sections. The separator 1200 can be placed in the bottom section 1202 as shown or can be used with other straining devices or just placed within a pot. As shown in FIG. 12, the separator 1200 is placed in the bottom section 1202, which is then placed in a pot 1204. The different food is placed in different sections. A cover 1206 can be used to cover the pot 1204. FIG. 14b shows a cross section of the device shown in FIG. 14a.

FIG. 15 shows an embodiment of the device wherein the device has a top sectional component 1300, where different foods can be separated. The middle section 1302 and bottom section 1304 have straining sections 1306 and open sections 1308. In the open sections 1308, a user can place food which is then left in the pot 1310 once the device is removed. In the straining sections 1306, the food that is left in the straining section 1306, is removed from the pot 1310. In this regard a user can make chicken soup by placing the chicken in the straining section 1306 which is removed from the pot 1310, but place carrots in the open section 1308, which is left with the soup when the device is removed.

FIG. 15b shows an alternative embodiment of FIG. 15a. FIG. 15c shows the device in use cooking.

Figure 16A:
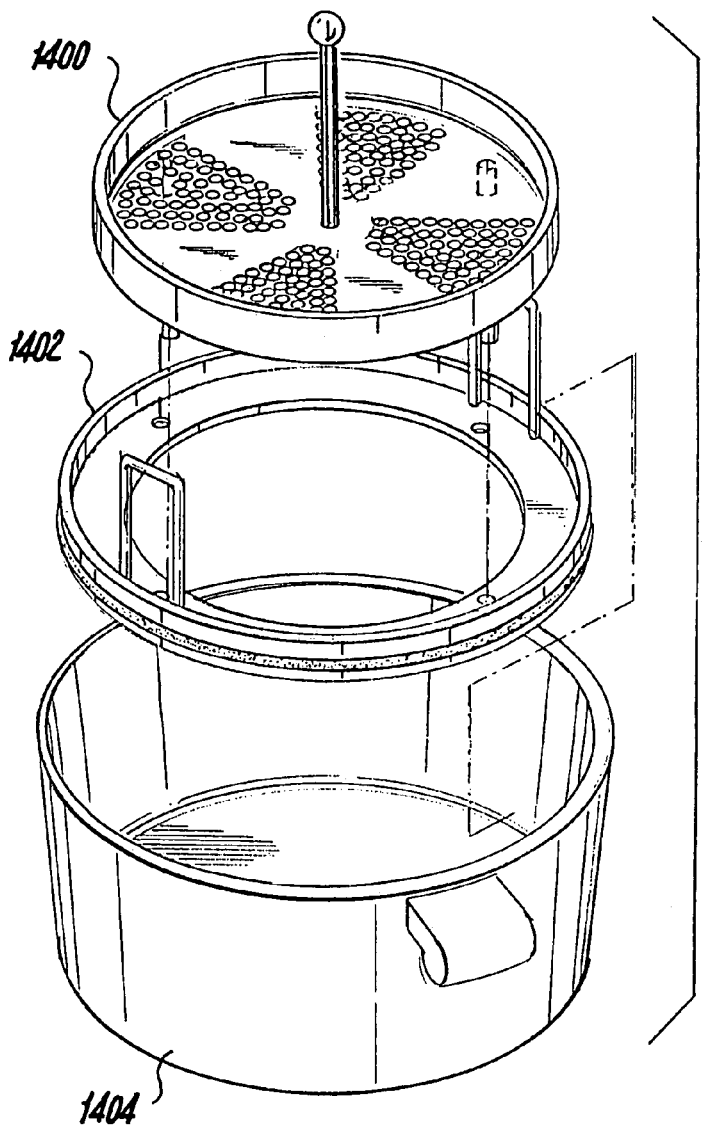
FIG. 16a shows the device of the present invention having sections used to expand the diameter of the device.

FIG. 16a shows the device 1400 of the present invention having sections 1402 used to expand the diameter of the device to fit a pot 1404.

Figure 16B:
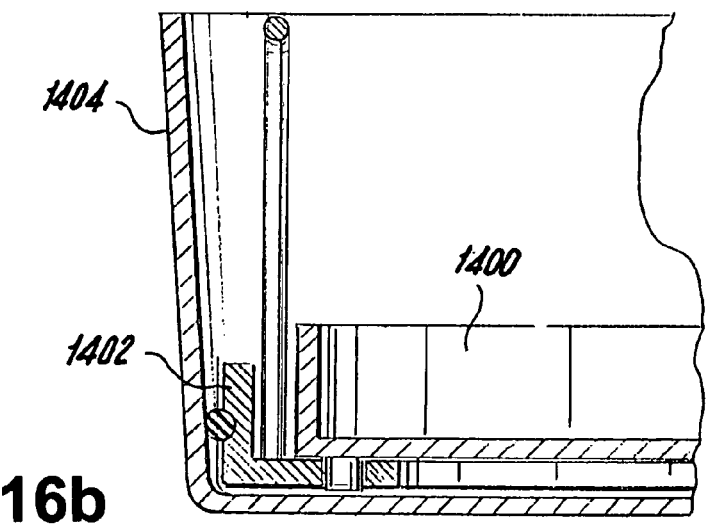

FIG. 16b shows a cross section of the device of FIG. 16a. The invention claimed is:

1. A device and cooking pot combination comprising: a cooking pot and a device comprising a strainer comprising an extended area member having strainer holes and at least one solid area with no holes and an upper surface and said strainer further includes an upstanding wall extending circumferentially around an outer rim of the strainer extended area member defining a reservoir;

wherein said device further comprises a stopper comprising an extended area member that has stopper holes and at least one solid area with no holes and a lower surface, the stopper extended area member being positioned above said strainer extended area member in a liquid sealable surface to surface relationship and the stopper extended area member being substantially located below an upper edge of the strainer upstanding wall;

a handle which is attached to said strainer and/or said reservoir;

said stopper further comprising a stopper control rod used to position said stopper in an open position where at least one of said stopper holes are aligned with at least one of said strainer holes to allow liquid to flow through said stopper and strainer, and a closed position where all of the strainer holes and all of the stopper holes are blocked by corresponding solid areas on the stopper and strainer respectively; and wherein said device is placed in said cooking pot.

2. The combination of claim 1 wherein additional parts are added to said device to expand diameter of said device so that it can fit into different size pots.

3. The combination of claim 1 wherein said device comprises stainless steel.

4. The combination of claim 1 wherein said device comprises a microwaveable polymer.

5. The combination of claim 1 wherein said device is used in a conventional oven.

6. The combination of claim 1 wherein said device is used in a microwave oven.

7. The combination of claim 1 wherein said device is hung over edges of said pot, and suspended within said pot and is suspended at different depths in said pot.

8. The combination of claim 1 wherein said pot has internal ridges which can support said device at different depths within said pot.

9. The combination of claim 1 wherein said device is expanded once inside a pot and is wedged against sides of said pot so that said device can be placed at different depths within said pot.

10. The combination of claim 1 wherein said device has sections added to its outside to expand the diameter of said device.

11. The combination of claim 1 further comprising:
a flange around the outside of said device to prevent said device from dropping to bottom of a said pot.

12. The combination of claim 1 further comprising:
wherein said handle attached to the strainer is an adjustable handle.

13. The combination of claim 12 wherein said handle is attached to said strainer by a screw which allows said handle to move up and down to lower and raise said device in said pot.

14. The combination of claim 12 wherein said handle holds said device in said pot and keeps said device at different levels in said pot.

15. The combination of claim 12 wherein said handles are placed in grooves on the outside of a pot.

16. The combination of claim 1 wherein said handle attached to said strainer and/or reservoir is detachably attached.

17. The combination of claim 1 wherein said stopper control rod is a detachably attached part of the stopper.

18. A device and bowl combination comprising: bowl comprising a top piece and a bottom piece and a device comprising;
- a strainer comprising an extended area member having strainer holes and at least one solid area with no holes and an upper surface and said strainer further includes an upstanding wall extending circumferentially around an outer rim of the strainer extended area member defining a reservoir;
- wherein said device further comprises a stopper comprising an extended area member that has stopper holes and at least one solid area with no holes and a lower surface, the stopper extended area member being positioned above said strainer extended area member in a liquid sealable surface to surface relationship and the stopper extended area member being substantially located below an upper edge of the strainer upstanding wall;
- a handle which is attached to the strainer or the reservoir;
- said stopper further comprising a stopper control rod used to position the stopper in an open position where at least one of said stopper holes are aligned with at least one of said strainer holes to allow liquid to flow through said stopper and strainer, and a closed position where all of the strainer holes and all of the stopper holes are blocked by corresponding solid areas on the stopper and strainer respectively;
- wherein the strainer and the stopper are placed in the bottom piece and secured within the bowl with the top piece.

19. The combination of claim 18 wherein said handle attached to said strainer and/or reservoir is detachably attached.

20. The combination of claim 18 wherein said stopper control rod is a detachable part of said stopper.

* * * * *